US012739237B2

(12) United States Patent
Lal et al.

(10) Patent No.: US 12,739,237 B2
(45) Date of Patent: Sep. 15, 2026

(54) MULTIPLE TERMINALS WITH ROTATING LICENSE MANAGEMENT

(71) Applicant: Adeia Guides Inc., San Jose, CA (US)

(72) Inventors: Dhananjay Lal, Englewood, CO (US); Ville Ollikainen, Vihti (FI); Pekka Koskela, Oulu (FI); Markku Kylanpaa, Helsinki (FI); Anni Karinsalo, Oulu (FI)

(73) Assignee: Adeia Guides Inc., San Jose, CA (US)

( * ) Notice: Subject to any disclaimer, the term of this patent is extended or adjusted under 35 U.S.C. 154(b) by 285 days.

(21) Appl. No.: 18/137,364

(22) Filed: Apr. 20, 2023

(65) Prior Publication Data

US 2024/0356907 A1 Oct. 24, 2024

(51) Int. Cl.
*H04L 9/40* (2022.01)

(52) U.S. Cl.
CPC ........ *H04L 63/0815* (2013.01); *H04L 63/108* (2013.01)

(58) Field of Classification Search
CPC . H04L 63/0815; H04L 63/108; H04L 63/068; H04L 2463/103; G06F 2221/2137; G06F 2221/2139; G06F 21/10; G06F 21/33; H04W 12/61; H04W 12/0433; H04W 12/63; H04W 12/50; H04W 12/77; H04W 12/06
See application file for complete search history.

(56) References Cited

U.S. PATENT DOCUMENTS 9,846,899 B1 * 12/2017 Stickle .................. G06Q 30/06
10,992,972 B1 4/2021 Zhang et al.
(Continued)

FOREIGN PATENT DOCUMENTS

CA 3166719 A1 7/2021
CN 105262725 A 1/2016
(Continued)

OTHER PUBLICATIONS

"Helios | The open source platform you can use to create decentralised social media apps and Social Network Services", retrieved at https://helios-social.com/, on Jun. 28, 2023.
(Continued)

*Primary Examiner* — Izunna Okeke
(74) *Attorney, Agent, or Firm* — HG LAW LLP

(57) ABSTRACT

Systems and methods of rotating content license management for multiple terminals associated with the same content service subscription user account are disclosed. An ephemeral master device (EMD) is selected from a domain of client devices associated with the same user account. The content service generates an Ephemeral Personal Credential (EPC) associated with the user account, which is temporary and is updated periodically or randomly. The EMD role rotates among the devices in the domain periodically or randomly. The updated EPC is sent to the current EMD. A client device can access content via the user account by providing 1) the account credentials and 2) a valid EPC. Account credentials may be shared with the client device. The EPC is shared with the client device when the client device moves within a particular range of the EMD (or another device in the domain which has the EPC) to synchronize the EPC.

20 Claims, 6 Drawing Sheets

(56) References Cited

U.S. PATENT DOCUMENTS

| | | | | |
|---|---|---|---|---|
| 11,463,426 | B1 | 10/2022 | Wheeler et al. | |
| 2008/0256646 | A1* | 10/2008 | Strom | H04L 9/0825 726/29 |
| 2014/0026193 | A1 | 1/2014 | Saxman et al. | |
| 2018/0247483 | A1 | 8/2018 | Lindsay | |
| 2019/0007422 | A1 | 1/2019 | Fieldman | |
| 2021/0144441 | A1 | 5/2021 | Shetty et al. | |
| 2021/0173900 | A1 | 6/2021 | Craggs | |
| 2021/0326467 | A1 | 10/2021 | Levy et al. | |
| 2022/0394042 | A1 | 12/2022 | Maoz | |

FOREIGN PATENT DOCUMENTS

| | | | | |
|---|---|---|---|---|
| CN | 111970250 | A | 11/2020 | |
| EP | 2819047 | A1 * | 12/2014 | G06F 21/1086 |
| JP | 2015069257 | A | 4/2015 | |
| WO | 2017084318 | A1 | 5/2017 | |

OTHER PUBLICATIONS

"LibP2P | A modular network stack", retrieved at https://libp2p.io/, on Jun. 28, 2023.

"Microsoft | PlayReady Domains", retrieved at https://learn.microsoft.com/en-us/playready/features/domains, Nov. 6, 2018.

"Open Mobile Alliance | DRM Architecture", Approved Version 2.0.1, OMA-AD-DRM-V2_0_1-20080226-A, Feb. 26, 2008.

"RSA Unified Identity Platform", retrieved at https://www.rsa.com/, on Jun. 28, 2023.

"Streamr | The decentralized real-time data network", retrieved at https://streamr.network/, on Jun. 28, 2023.

Alexander, Julia, "Netflix is trying to crack down on password sharing with new test", The Verge, retrieved at https://www.theverge.com/2021/3/11/22325831/netflix-password-sharing-test-feature-piracy-security-streaming-video, Mar. 11, 2021.

Copperpod Intellectual Property, "Digital Rights Management (DRM): Comparing PlayReady, FairPlay and WideVine", retrieved at https://www.copperpodip.com/post/2020/02/25/digital-rights-management-comparing-playready-fairplay-and-widevine, Feb. 25, 2020.

Douthwaite, Andrew, "What Your Business Can Learn From Netflix About Credential Sharing", retrieved at https://virtualarmour.com/credential-sharing-what-business-can-learn-from-netflix/, Dec. 8, 2021.

Koster, P., et al., "Introduction of the Domain Issuer in OMA DRM", 2007 4th IEEE Consumer Communications and Networking Conference, 2007, 940-944.

Long, Chengyi, "Paying to Share Netflix Outside Your Household", retrieved at https://about.netflix.com/en/news/paying-to-share-netflix-outside-your-household, Mar. 16, 2022.

Patat, Gwendal, et al., "Exploring Widevine for Fun and Profit", arXiv preprint arXiv:2204.09298, Apr. 20, 2022.

Richter, Felix, "The State of Netflix Mooching", retrieved at https://www.statista.com/chart/27333/netflix-password-sharing/, Apr. 27, 2022.

Sherman, Alex, "Netflix is finally going after password sharing. Here's how it's likely to work", retrieved at https://www.cnbc.com/2022/04/23/how-netflixs-password-sharing-crackdown-is-likely-to-work.html, Apr. 23, 2022.

* cited by examiner

MULTIPLE TERMINALS WITH ROTATING LICENSE MANAGEMENT

FIELD OF DISCLOSURE

Embodiments of the present disclosure relate to content license management for multiple terminals in a subscription with a content provider.

SUMMARY

Unauthorized sharing of account credentials between friends, family, or other third parties in content subscriptions results in license agreement violations and lost revenue for media providers. Sharing of account credentials among multiple devices also raises security and user privacy concerns, such as risks associated with using platform-specific credential management system. However, the usability value of allowing users to share credentials with multiple devices is desirable. As such, there is a desire for improved methods for managing license sharing for multiple terminals (e.g., devices) associated with a content subscription.

Accordingly, techniques are disclosed herein for managing license sharing between multiple devices accessing a shared subscription account. According to some embodiments, an Ephemeral Master Device (EMD) is selected from a domain of client devices (e.g., devices) associated with the same account. The content service generates an Ephemeral Personal Credential (EPC or license) associated with the account. The EPC is temporary and is updated periodically or randomly. The EMD role may rotate among the devices in the domain periodically or randomly. The identity of the EMD can be kept secret, for example, such that a device user does not know or is not informed of what device is performing the EMD role. The updated EPC is sent to the current EMD. A client device can access content via the account by providing 1) the account credentials and 2) a valid (e.g., unexpired) EPC. Hence, multiple devices in the domain which can provide account credentials and a valid EPC can use the same account concurrently. In some examples, the content service provider memorizes the updated EPC as well as at least one of the previous EPCs. In other examples, the content service memorizes a temporary EPC provided to a new or temporary client device upon its first login to the account, to allow for immediate content access for a limited time. Thus, a valid EPC can be the updated EPC, at least one of the previous EPCs, or the temporary EPC.

Account credentials may be shared with the client device. The updated EPC is automatically shared (e.g., synchronized) with the client device when the client device is located within a particular range of the EMD (or another device in the domain which has the updated EPC). In an example, a client device may have an EPC that is not updated, but valid (for example, the content service issued the client device a temporary EPC on a first-time login or the client device still has only the previous EPC which has expired but remains valid for a certain time, the grace period). When the client device is within range of the EMD (or another domain device with the updated EPC), the EPCs are automatically synchronized, resulting in the client device now having an updated EPC (in the example, the current EPC). When synchronizing EPCs between devices, the older EPC (e.g., on one device) is replaced with the more recent or current EPC (e.g., matching the EPC of the other device). According to some embodiments, the synchronization of EPCs between devices when they are in proximity of each other occurs automatically (e.g., in the background and without user intervention).

A client device that has not received the current EPC and that is not within proximity (e.g., within a certain range) of the EMD (or another device in the domain which has the updated EPC) is unable to receive the current EPC for accessing content. It may, however, have the previous EPC or a temporary EPC as a valid EPC. Thus, the EMD and/or other domain devices which have a valid EPC may be present anywhere the account is in use.

Periodically or randomly, the EMD role changes to another device, and the new EMD receives a newly generated EPC. Thus the EPC on the other client device becomes older, albeit valid until a certain time. The client devices are unable to access content unless each one synchronizes EPCs by being located within a particular range of the new EMD (or another device that has received the current EPC).

According to some embodiments described herein, an EPC associated with the account is generated (e.g., by the content service). The EPC is transmitted to a first device (e.g., a master device) from a plurality of devices (e.g., a domain). Each of the plurality of devices may be associated with the account (e.g., part of the account domain). In response to determining that the first device is within a particular range of a second device (e.g., a client device) of the plurality of devices, the second device automatically synchronizes the EPC with the first device. The content service receives account credentials from the second device. The account credentials are determined to be associated with the account. In response to determining that the received EPC is valid, the second device is provided access to content associated with the account. In some examples, the content service may issue a temporary EPC to the second device, that is valid only for a certain time, during which it must synchronize to the current EPC, from the first device or another device with the current EPC.

According to some embodiments, the first device (e.g., master device) is randomly selected from the plurality of devices. In other embodiments, the first device is at least one of: the most recently used from the plurality of devices or the most frequently used from the plurality of devices. In some embodiments, a subset of the plurality of devices associated with the account may be used for this selection.

According to some embodiments, a subsequent EPC (e.g., updated EPC) associated with the account is generated periodically. Each subsequent EPC is valid during a corresponding subsequent time period. During the subsequent time period, the EPC (e.g., previous EPC) and/or the subsequent EPC (e.g., updated EPC) can be valid.

According to some embodiments, the first device comprises one of the plurality of devices that is associated with the account credentials for at least an onboarding period.

According to some embodiments, a temporary EPC associated with the account is generated (such as, by the content service) when account credentials are received from the second device (e.g., during its first login attempt), wherein the second device is not recognized as part of the domain (e.g., no history of content access associated with the account). The temporary EPC is transmitted to the second device (e.g., upon the first login by the first device to the account). The temporary EPC is received from the second device during the same (e.g., first) login attempt or subsequent login attempts requesting content access. In response to determining that the received temporary EPC is valid, the second device is provided access to content associated with the account. The temporary EPC is valid for a time period.

Thus, to continue accessing content, the second device should eventually synchronize with the current EPC associated with the account (e.g., receive the current EPC from the first device) within the time period.

According to some embodiments, a QR code is displayed on the first device. The QR code is captured by the second device from the first device when the devices are within a particular range of each other (for example, a visible range). The QR code is received (e.g., by the content service) from the second device. In response to determining that the second device is within a particular distance of the first device based on the QR code, the EPC is transmitted (e.g., by the content service) to the second device. In some embodiments, the QR code is updated. The updated QR code is displayed on the first device. The updated QR code is captured by the second device from the first device when the devices are within the particular range of each other. In response to the updated QR code being received (e.g., by the content service) from the second device, the EPC is transmitted to the second device.

According to some embodiments, in response to determining that the EPC has not been received from at least one device in addition to the master device during a time period, a second EPC is generated and transmitted to another device that is selected as the master device.

According to some embodiments, in response to determining that a number of logins to the account using the EPC is over a threshold number of logins during a time period, a second EPC is generated and transmitted to the second device.

BRIEF DESCRIPTION OF THE FIGURES

The various objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
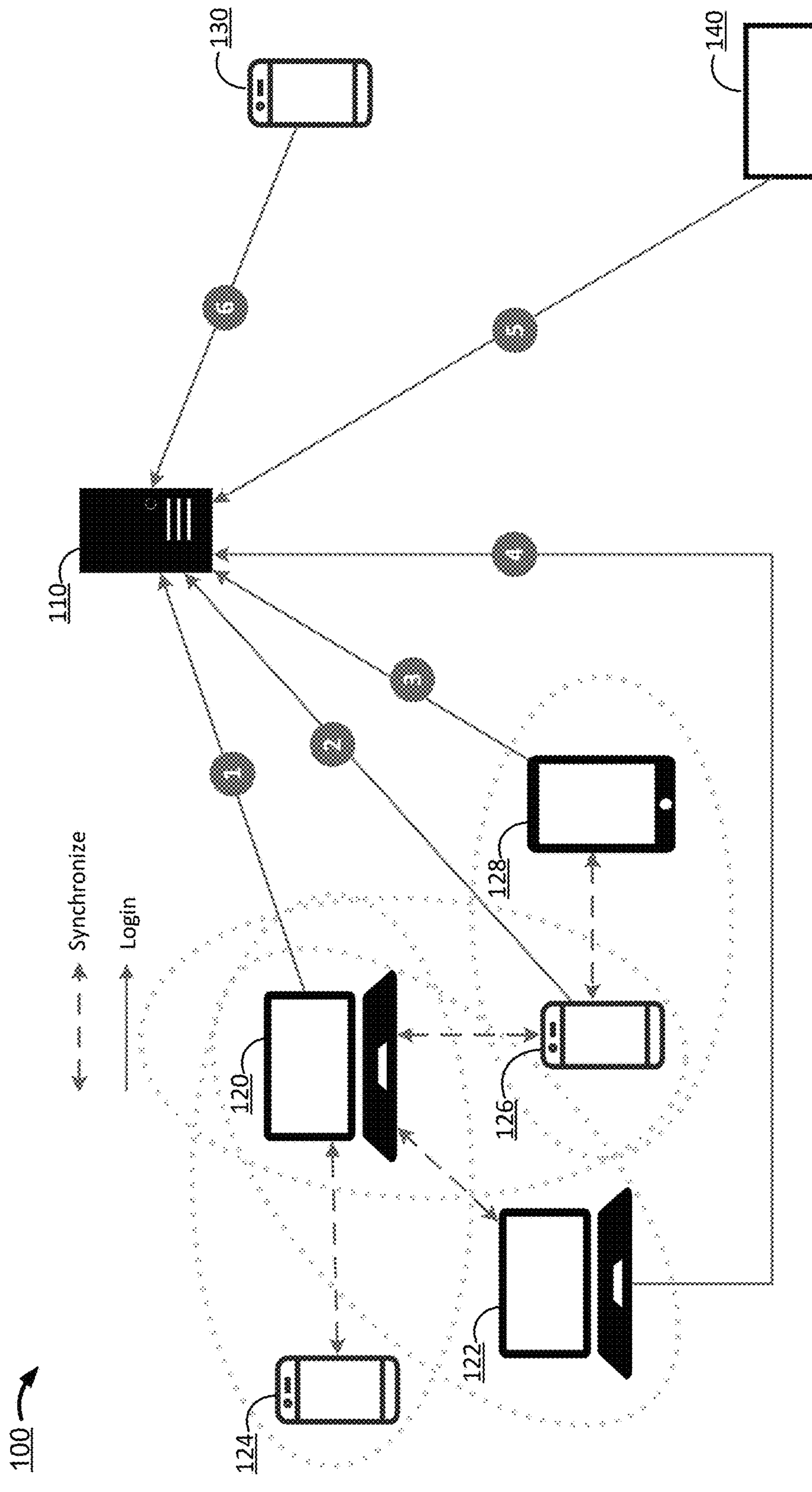
FIG. 1 is an illustrative diagram of a system for rotating license management, in accordance with some embodiments of the disclosure.

Embodiments of the disclosure include methods of and systems for managing license sharing between multiple devices using the same subscription account. The concepts that follow are used to describe embodiments of the disclosure.

Content refers to a variety of digital assets or items that are received for presentation, and with access provided by a content provider (also referred to as a content service). For example, content or a content item may include streaming video content, streaming audio content, other multimedia content, advertisements, e-books, electronic newspapers or other text-based content, audio book content, video games, e-commerce goods or services, advertisements, rewards programs, app stores, software licenses, computer-executable programs or applications, and the like. Content can also refer to any services associated with a subscription-based model that can be consumed.

Content service (also referred to as content provider or content service provider) is a distributor of the content and/or a service that provides access to the content. In some embodiments, techniques as described herein for managing access to content from a content service may be applied to a variety of other subscription-based models. For example, a content service can be a media content provider, audio book subscription provider, e-book or e-newsletter provider, e-commerce platform, an application provider or store, a game streaming service, advertisement provider, or rewards program provider, etc.

Domain refers to the collection of client devices associated with a user account (also referred to as subscription account or content service subscription account). For example, the domain includes devices that a user can use under a single license. In some embodiments, the maximum number of devices and/or type of devices allowed in the domain is defined by the licensing terms associated with the subscription account. A client device may become part of the domain when it has accessed content associated with the account. In an embodiment, the domain comprises devices belonging to a single household (described below).

Subscription refers to a user's contract with the content service. Under a subscription, the user may consume or access content items according to licensing terms within the subscription.

Account (also referred to as user account or subscription account) is associated with a subscription to use content according to licensing terms (below). The account may be associated with a user or a household. A household can comprise a plurality of household members. The household (e.g., household size, member identities and relationships, member location, etc.) may be defined by the licensing terms. Each household member may be associated with one or more personal devices (e.g., client devices) associated with the account (e.g., shared account). For example, devices associated with members of a household may share the same public IP address or be located within a common geolocation area for a certain time. A household may have devices that have common usage across multiple household members, such as a television set. In an embodiment, a domain of an account comprises devices owned by a single household.

A licensing agreement is defined by the content service and is an agreement between the content service and user. Licensing terms of the licensing agreement define the domain, e.g., the number of client devices which may be concurrently in use under one user account. A license is a permission or authorization for a device to access content according to the licensing terms.

Credentials are technical qualifications for consuming content. Account Credentials are credentials associated with and are unique to the user account. For example, account credentials comprise such qualifications for consuming content that the user can enter and/or share with other users (e.g., other devices), in order to access the content through the user account. Account credentials typically comprise a login (e.g., username) and password.

Keys may be used for decrypting encrypted content.

FIG. 1 is an illustrative diagram of a system for rotating license management, in accordance with some embodiments of the disclosure. In an embodiment, the system comprises client devices (also referred to as devices) 120, 122, 124, 126, 128, 130, and 140, and content service 110. Although the client devices are shown in the example as various devices such as laptops, mobile devices, tablets, etc., user devices 120, 122, 124, 126, 128, 130, and 140 may each comprise any computing device that can consume content. The system can include any number of devices, where a device may belong to a domain associated with an account or may be outside of the domain. A device is part of the domain if the device accesses or has accessed content through the account associated with the domain. The domain size (e.g., the number of devices which can concurrently access content under the same account) or type of devices of the domain may vary based on the licensing terms of the subscription. The domain size may also change dynamically based on any changes to the subscription and/or licensing terms associated with the account.

Content service 110 is a distributor or access provider of the content, for example a content service provider of streaming media content, e-books, etc. Although content service 110 is described as a media content service provider and "access" is described as access to media content from the media content service provider through this disclosure, it should be noted that the embodiments disclosed herein may additionally or alternatively describe a content service comprising a variety of other providers of subscription-based models (e.g., e-commerce, e-books, video gaming, audio streaming, advertisements or other rewards programs, application stores, software licenses, streaming video, and so forth), as well as access to such subscription-based services. For example, system and methods described herein could be used to manage licenses or access among multiple devices for a rewards program or video gaming account. In such scenarios, "content service" may be replaced with "rewards provider" or "video gaming service provider," respectively, and "content access" with "rewards access" or "gaming access," respectively.

According to an embodiment, a user (or a household) has a subscription account (also referred to as account or user account) with content service 110. In an example, suppose Alice is an account holder of a subscription to content service 110. Devices 120, 126, and 128 belong to Alice. Additionally, devices 122 and 124 belong to members of Alice's family-Bob and George, respectively—and are also within the same household associated with the account. Devices 130 and 140 belong to other users that may be outside of the household. For example, device 130 can belong to someone not in Alice's family but with which Alice shares her account credentials (for example, her boyfriend Carl), and device 140 may be an outside device that does not belong to Alice's family or friends but is intended to be used as a temporary device with the account (such as a hotel television while traveling). Any of the devices 120, 126, 128, 122, 124, 130, and 140 may concurrently access content associated with Alice's subscription (and therefore become part of the domain) by providing 1) Alice's account credentials and 2) a valid Ephemeral Personal Credential (EPC) associated with the account.

At step 1 of FIG. 1, Alice logs into her account via her laptop 120, wherein account credentials are provided to content service 110, according to an embodiment. A device may be added to the domain associated with the account by accessing content through that device. Registration of the device with the account, i.e., adding the device to the domain, can occur automatically when the device accesses content associated with the account using the account credentials. Further in the embodiment, the device may remain in the domain after completing an onboarding period. An onboarding period may be a particular length of time, during which the device is in use with the account (for example, the device has accessed content through the account, or has accessed content a certain number of times). Devices, such as temporary devices, which are added to the domain but are no longer in use with the account beyond the onboarding period are removed from the domain. Temporary devices and the onboarding period are discussed in further detail in Step 5 of FIG. 1.

In an embodiment, content service 110 generates ephemeral personal credentials (EPC) associated with Alice's account (e.g., each EPC generated for the account is unique to the account). The EPC remains current until a certain time period expires. The EPC may be randomly generated, selected (e.g., randomly or based on predefined rules) or rotated from among a plurality of EPCs, updated periodically, or otherwise dynamically generated as defined by the content service 110. Content service 110 allows content access if it receives the correct account credentials and a valid EPC from the requesting client device. While the EPC is valid, a device can use the same EPC for multiple consecutive logins to the same account and/or to access multiple content items. Content service 110 can accept the current EPC as a valid EPC. Additionally, content service 110 can memorize previous EPCs and accept at least one of the previous EPCs (e.g., during a grace period, described further below) as a valid EPC.

In the example, Alice's laptop 120 is the first device to provide account credentials to request content access through the account (e.g., no history of other devices added to the domain associated with this account). Upon verifying the credentials for the first device to request access for the first time, content service 110 transmits an EPC to the laptop 120. To access content thereafter, laptop 120 may provide account credentials and the EPC (e.g., so long as the EPC remains valid) to content service 110. Subsequent devices requesting content access for the first time (e.g., subsequent devices 126, 128, 122, 124, 130, and/or 140 to be added to the domain) may receive a temporary EPC (temp EPC or tEPC) that is valid for a period of time (e.g., a limited period such as 48 hours, etc.). The temporary EPC may be used for multiple requests to access content during its short lifespan. Once the temporary EPC expires, it is no longer valid and content service will deny content requests which use the expired temporary EPC. Thus, for the subsequent devices to continue accessing content after the temporary EPC is no longer valid, they may be required to eventually provide an EPC. A subsequent device can obtain the EPC when its temporary EPC is automatically updated and replaced with (e.g., synchronized) the EPC when the subsequent device is within a particular distance of another device which already has the current EPC.

In some embodiments, the temporary EPC may be any arrangement that provides temporary access to a device which does not have an EPC. For example, an arrangement may include identifying an identifier that is associated with the device, or providing the device with an identifier. Content service 110 memorizes and accepts such identifier as a temporary EPC for a limited period of time.

In an embodiment, EPCs can be shared (e.g., synchronized) between devices in the domain. In particular, the system may periodically check (e.g., in the background) 1)

whether two devices are within a particular range of each other, and 2) if so, whether the EPCs between the devices are the same. If the EPCs are different, the device with the older (or temporary) EPC may be automatically updated (e.g., synchronized) with the more recent EPC of the other device. According to some embodiments, the other device is an ephemeral master device (EMD) (also referred to as a master device). The master device is a device in the domain which receives the updated EPC when it is generated from content service 110. The master device subsequently shares (e.g., synchronizes) the updated EPC automatically to the other client devices in the domain when such devices and the master device are within range of each other.

According to some embodiments, the master device changes or rotates between devices in the domain, referred to as EMD rotation. In an embodiment, the identity of the device having the master device role is kept secret. When a new EPC for the account is generated, the new EPC is transmitted to the current master device. In some embodiments, during each EMD rotation, the master device is the sole and/or first device in the domain to which content service 110 sends the new EPC. The master device role can rotate at preconfigured periods or events (such as every set time interval, or after every other new EPC has been generated, and the like) or at randomly determined times. The master device may rotate between devices in the domain based on settings preconfigured by content service 110. In some embodiments, each subsequent rotation may be based on the same or a different method for selecting the master device as that of the previous rotation. In yet another embodiment, multiple devices in the domain can be designated the master device.

In one embodiment, the master device is selected randomly from the domain of devices. In another embodiment, the master device is the device in the domain which was most recently used in connection with the account (such as the last device to log into the account and consume content) or is selected randomly from a set of most recently used devices (for example, the last 3 used devices in connection with the account). In yet another embodiment, the master device is the last device in the domain to receive the current EPC. In another embodiment, the master device is the device in the domain which most frequently accesses content, or may be randomly selected from a set of most used devices (for example, the top 3 devices which most frequently access content).

In some embodiments, the master device is selected based on the frequency of device movement (e.g. frequency of change in location of a device). For example, a device in the domain which is more stationary than others (e.g., a set-top box (STB), smart TV, streaming stick coupled to a display, home assistant, etc.), may be selected as the master device. In other embodiments, the master device is selected based on the number and/or time a device is in proximity of other devices in the domain. For example, a device which is within a particular range of a certain number of other devices in the domain and/or for a certain period of time may be selected as the master device.

Newly added or temporary devices in the domain may need to complete the onboarding period before they can be selected as the EMD. For example, the onboarding period can be completed when the device has accessed content through the account for a period of time (such as eight weeks) or has accessed content with a certain frequency (such as by logging into the account a threshold number of times). Completion of the onboarding period may also be based, in part, on the device being in proximity of a threshold number of other devices in the domain and/or for a threshold period of time.

In another embodiment, a device which has been onboarded may be exempt from consideration as an EMD if unusual activity associated with such device is detected. For example, a device may be detected based on its GPS coordinates or other similar geolocation determination methods, to be located in an area that is not typical of the device. In another example, while most of the devices in the domain are clustered within a similar area, the device with unusual activity is detected to be significantly far away from the rest of the devices. Content service 110 may flag the device and not consider it as a potential master device and/or may notify the account holder or prompt the account holder to confirm whether the device should be opted out (e.g., flagged and/or removed from the account domain). In another example, an option may be available for the account holder to opt in the device (e.g., notify content service 110 that they are moving to a new location, traveling, etc.), such that content service 110 will not flag the device and will continue to include the device in the set of domain devices from which to select the next EMD.

In some embodiments, a home device that may not be a client used for content consumption, such as a wireless router or a home assistant, may be equipped with software associated with content service 110. In such embodiments, these or other alternate in-home devices may be able to act as the EMD that receives the EPC from the content service, or a device that can synchronize its EPC to the current value from other clients (such as an EMD) as well as update other content consumption clients that have not received the current EPC.

Thus, to continue accessing content, a device may need to continuously have its EPC automatically synchronized with the current EPC. To do so, the device may need to continuously or periodically be located within a particular range of the EMD (or of another device which already has the current EPC, e.g., by way of a chain of synchronizations between devices linking back to the EMD), whichever such device the EMD may be at any given time. Accordingly, devices not in proximity to the EMD (or to other devices already synchronized with the current EPC) by the time their EPCs become invalid are unable to obtain the current EPC for accessing content. Proximity determination (e.g., range detection) is discussed in further detail in FIG. 2.

In the example, laptop 120 is the first device used (e.g., in connection with the account) in the domain. As such, laptop 120 is designated as the EMD. Laptop 120 can request to access content by sending the EPC to content service 110, and the request is authorized if the EPC is valid (e.g., current or previous but within the grace period, discussed further below).

According to some embodiments, the EPC is valid until it expires after a period of time. For example, the EPC may expire after a length of time (e.g., three days, three weeks, etc.) from the time it was generated, from the time it was transmitted to or used by the EMD, and so forth. In another example, the EPC may expire once a new EPC is generated and/or transmitted to a newly designated EMD, etc. In another embodiment, the EPC remains valid for a grace period after the original expiration time of the EPC. For example, content service 110 can memorize at least one of a set of previous EPCs for a grace period, during which content service 110 continues to recognize (e.g., validate or accept) the previous EPC(s) despite their expiration. Thus, during the grace period, both the updated (e.g., current) EPC and the memorized (e.g., previous) EPC are valid and can be used to access content. The grace period may be a predetermined length of time. In other embodiments, the grace period can be configured dynamically, for example, based on the number of devices that are in the domain at a given time, the level of activity of the account (e.g., how often content is consumed from the account, how many times a device logs into the account, etc.), and so forth. In yet another embodiment, the grace period may be unique to each device, such as upon receipt of account credentials from the device. In some embodiments, the grace period for an EPC begins when a time period expires and/or when an updated EPC is generated, transmitted to the EMD, or used by a device to access content, and so forth.

In some embodiments, the grace period may be implemented by any measure which keeps track of such grace period and/or how long the device has had the previous EPC (or how long the device has not yet used the updated EPC since the release of the updated EPC to the EMD). For example, content service 110 may memorize an identifier associated with the device. If content service detects the identifier from a device requesting content access after the grace period ends, it may deny the request.

At step 2 of FIG. 1, Alice logs into her subscription account to consume content from another device, namely her smartphone 126, according to an embodiment. She uses her smartphone 126 to provide her account credentials to content service 110. Once the account credentials are validated, smartphone 126 may be prompted to send a valid EPC to content service 110. If smartphone 126 is requesting content access through the account for the first time (e.g., does not yet have an EPC), content service 110 may provide smartphone 126 with a temporary EPC, which smartphone 126 in turn sends to content service 110 to access content temporarily. If smartphone 126 already has an EPC, the EPC is automatically sent to content service 110. If the EPC is valid (e.g., it is the current EPC which has not yet expired or is a previous EPC that has expired but is within its grace period), smartphone 126 is granted authorization to access content from content service 110 through Alice's account. In conjunction or in the alternative, if smartphone 126 does not have a valid EPC, smartphone 126 can update to the current (e.g., valid) EPC by synchronizing with the master device (e.g., laptop 120) if the devices are within range of each other. The synchronization can also occur at any time using background processes, prior to an attempt by the smartphone 126 to access content when it is within range of the master device (e.g., laptop 120).

At step 3 of FIG. 1, Alice now uses her tablet 128 and enters her account credentials to log into her account, according to an embodiment. Content service 110 validates the account credentials received from tablet 128, but also requires a valid EPC from tablet 128. For a limited time, tablet 128 may use a temporary EPC or a previous EPC that is recognized by content service 110 (e.g., a previous EPC in its grace period) to access content. However, tablet 128 may eventually need to synchronize its EPC (e.g., previous EPC or temporary EPC) with the current EPC before the previous EPC or temporary EPC becomes invalid. In the example, the system has rotated (e.g., updated) the EMD such that Alice's smartphone 126 has replaced laptop 120 as the current EMD. For example, the EMD has rotated to smartphone 126 because smartphone 126 was the most frequently used device to access content or was randomly selected as the EMD during EMD rotation. Content service 110 generates a new EPC, which is sent to the EMD (e.g., smartphone 126). When tablet 128 becomes located within range of the EMD (e.g., smartphone 126), the EPC on tablet 128 is updated to the current EPC, which tablet 128 can use to continue accessing content.

In another embodiment, tablet 128 can use a previous EPC (e.g., prior to EMD rotation) to access content if the previous EPC is still valid during a grace period. For example, suppose tablet 128 previously synchronized EPCs with laptop 120 (e.g., during the time when laptop 120 was the EMD). This previous EPC has expired. Meanwhile, smartphone 126 has become the current EMD and/or received the current EPC. However, the previous EPC may remain valid for a grace period. For example, content service 110 may continue to recognize the previous EPC up to two weeks after the previous EPC has expired. While tablet 128 can continue to use the previous EPC to gain access to content, it may eventually need to update its EPC to the current one before the grace period ends. For example, tablet 128 can automatically update its EPC by being located within a certain range of and synchronizing EPCs with the current EMD (such as smartphone 126) or another device in the domain which has the current EPC (such as laptop 120, if laptop 120 has updated and synchronized its EPC with smartphone 126).

According to some embodiments, devices that are in the same domain can automatically synchronize EPCs with each other when they are within a particular distance of each other. For example, devices of members of the account holder's family are added to the domain by sharing account credentials and providing a temporary EPC to access content. However, the temporary EPC may be used to access content for a limited time (e.g., until the temporary EPC is no longer valid) and may need to be synchronized with a current EPC to continue access. In the example, laptop 122 belongs to Alice's son George, and smartphone 124 belongs to Alice's brother, Bob. Alice's laptop 120 has the current EPC. Both George's laptop 122 and Bob's smartphone 124 have previously accessed content using Alice's account credentials and a temporary EPC or previous EPC. When George's laptop 122 comes into a particular distance of Alice's laptop 120, laptop 122 automatically synchronizes EPCs with laptop 120 (e.g., laptop 120 shares its EPC with laptop 122). Likewise, when Bob's smartphone 124 comes into the particular distance of Alice's laptop 120, smartphone 124 automatically synchronizes EPCs with laptop 120 (e.g., laptop 120 shares its EPC with smartphone 124).

At step 4 of FIG. 1, George uses his laptop 122 to log into Alice's account using Alice's account credentials, according to an embodiment. Content service 110 validates the account credentials. Laptop 122 also sends its EPC to content service 110, which validates the EPC and authorizes laptop 122 to access content. Likewise, Bob uses his smartphone 124 to log into Alice's account using Alice's account credentials, which content service 110 validates. Smartphone 124 also sends its EPC to content service, which validates the EPC and authorizes smartphone 124 to access content.

At step 5 of FIG. 1, suppose Alice leaves for a business trip and logs into her subscription account using the hotel television 140. Hotel television 140 may receive a temporary EPC, which hotel television 140 uses to access content through the account for a limited time. Alice brings her smartphone 126 on trip. Smartphone 126 has a valid EPC associated with her account. If smartphone 126 is detected to be within proximity of hotel television 140 and the EPCs of the two devices are determined not to match, the EPCs are automatically synchronized such that the device with the older (or temporary) EPC is updated with the newer EPC of the other device (e.g., the temporary EPC of hotel television 140 is replaced with the current EPC of smartphone 126).

Meanwhile, suppose EMD rotation occurs during the business trip and Alice's smartphone 126 becomes EMD and receives a new EPC, while George and Bob remain at home. In an embodiment, content service 110 can memorize the previous EPC for a grace period, such that George and Bob can continue accessing content using the previous EPC and without their devices needing to synchronize with an EMD that is now far away (e.g., Alice's smartphone 126) until Alice returns home.

In another example, suppose Alice forgets to bring any of her devices (which have a valid EPC) on the trip. According to some embodiments, content service 110 sends an EPC only to devices which have completed the onboarding period (e.g., devices which have been registered with and remain on the account's domain) or devices that have been used to access content a certain number of times. Devices (e.g., new or temporary) which have not completed the onboarding period or threshold number of content access requests may receive a temporary EPC, in place of an EPC, for accessing content. For example, after Alice enters her account credentials through hotel television 140, content service 110 may identify hotel television 140 as a new or temporary device to the domain. Content service 110 can generate a temporary EPC and transmit it to hotel television 140. Content service 110 will accept the temporary EPC from hotel television 140 to access content, instead of an EPC, until hotel television 140 has completed an onboarding period or until hotel television 140 has synchronized its temporary EPC with an EPC of another device when the devices are in range of each other. The temporary EPC may be unique to each new or temporary device.

In an embodiment, a new or temporary device can complete the onboarding period and receive an EPC as a master device. In another embodiment, the new or temporary device can complete onboarding if the device is used in connection with the account for at least the onboarding period or is used a minimum number of times with the account during the onboarding period, and so forth. Completion of the onboarding period may also be based, in part, on the device being in proximity of a threshold number of other devices in the domain and/or for a threshold period of time. An onboarding period is typically longer than the grace period for which a previous EPC remains valid. In the example, if Alice continues to access content from hotel television 140 for an onboarding period (such as eight weeks, six months, etc.), then hotel television 140 can receive an EPC from content service as the master device. Hotel television 140 can be selected as the EMD and receive an updated EPC during EMD rotation. When the EPCs on other devices in the account domain are no longer current, they would need to come into a specific proximity of the EMD to be synchronized with the latest, current EPC. In the example, suppose hotel television 140 becomes the EMD and receives the current EPC after Alice has returned home, and all previous EPCs associated with Alice's account are no longer valid (e.g., grace periods for the most recent EPCs have ended). Alice will not be able to consume content from her account on her smartphone 126 unless the smartphone 126 is somehow within certain range of hotel television 140 to automatically synchronize with hotel television 140 to obtain the valid EPC.

In another embodiment, the system design may be configured to remove devices from the account's domain when they are no longer in use. For example, once hotel television 140 accesses content from the account, it is added to the domain. Once Alice stops using the hotel television 140 after returning home, after a new EPC is issued to the account on a chosen EMD, the hotel television 140 will no longer be able to access content after its grace period expires. In another embodiment, the account holder may define with the system which devices are for temporary use.

At step 6 of FIG. 1, suppose smartphone 140 belongs to Carl, Alice's boyfriend and Alice shares her account credentials with him. Carl and Alice end their relationship, but Carl's smartphone 140 becomes the EMD in Alice's account and receives an updated EPC. During the grace period, Alice, Bob, and George can continue accessing Alice's account using the previous EPC. When the grace period ends, the EPCs on Alice's (e.g., devices 120, 126, 128), Bob's (e.g., smartphone 124), and George's (e.g., laptop 122) devices are no longer valid, but these devices are out of range of the EMD (e.g., Carl's smartphone 130). In this case, Alice may need to contact customer service to reinstate the account in her name by providing additional authentication. The inconvenience caused is per system design, since Carl was previously treated by the content service as an authorized user, however the change in the relationship status converted Carl into an unauthorized user who continued to access the service.

In an embodiment, if the EMD has not been in use for a period of time (for example, the EMD is broken or lost), then the device is removed from the domain and/or will no longer be designated as the EMD during future EMD rotations. In another embodiment, when the EMD has not been in use for a period of time, the content service can designate a new EMD and send the same or newly generated EPC. In the example, Carl's smartphone 140 becomes the EMD after his relationship with Alice ends. Carl uses the new EPC on his smartphone 140 to access Alice's account. While he is on vacation with his new girlfriend, Eve, Carl can share Alice's account credentials. Eve's tablet can receive the current EPC by automatically synchronizing EPCs with Carl's smartphone 140 when the devices are within range of each other. Any other device that has Alice's account credentials and comes into proximity with Carl's smartphone 140 can also be automatically synchronized with the current EPC, and access content from Alice's account. Meanwhile, Alice's devices, being outside of range of Carl's smartphone 140, will eventually lose access to her own subscription account when the EPCs on her devices are no longer valid. Alice may need to call customer service to authenticate herself and reclaim her account. The content service can then reset the account and ask Alice to log into the account with new account credentials. The content service will then provide Alice's device with a new EPC.

Figure 2:
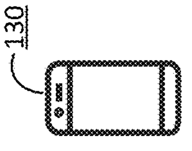
FIG. 2 is an illustrative diagram of device range detection in a system for rotating license management, in accordance with some embodiments of the disclosure.
Figure 2:
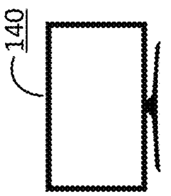
Figure 2:
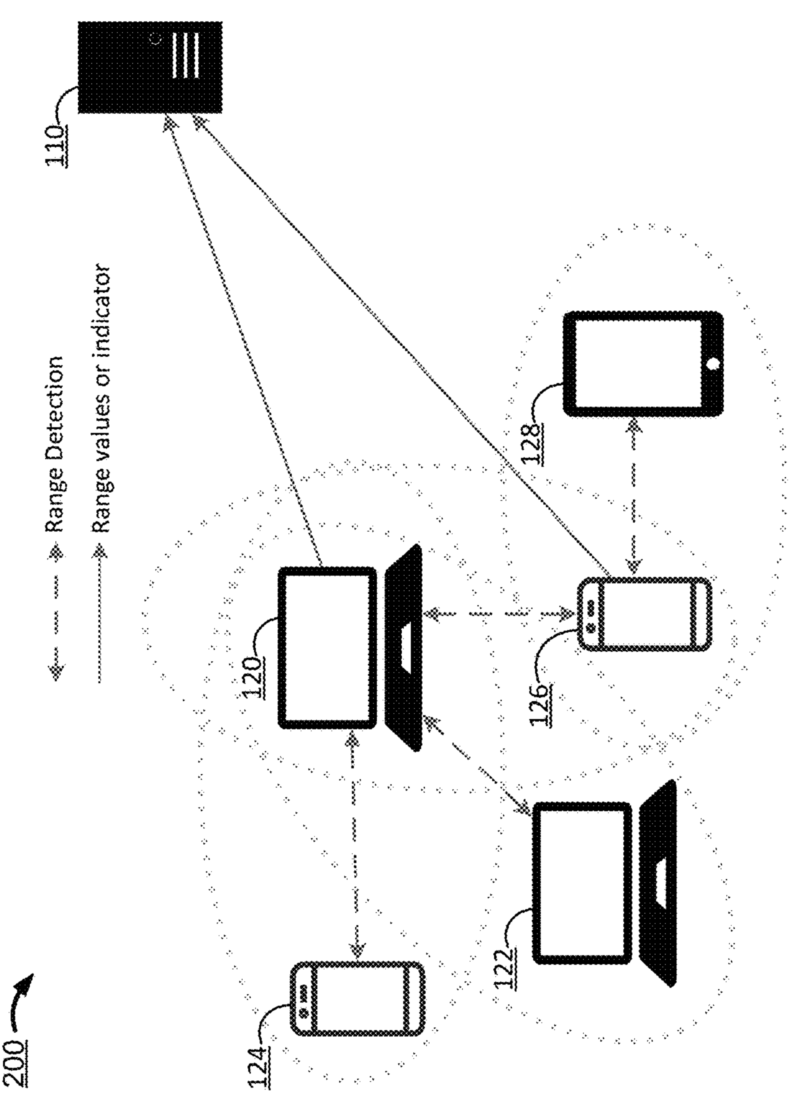

FIG. 2 is an illustrative diagram 200 of device range detection in a system for rotating license management, in accordance with some embodiments of the disclosure. In an embodiment, EPC synchronization between devices in a domain is authorized when the devices are within a particular range (hereinafter referred to as within range or within proximity) of each other. When synchronizing, the domain device which has the current EPC is the sharing device, and the domain device which has the older EPC or a temporary EPC (and/or requesting EPC synchronization) is the receiving device. The particular range may be a preconfigured distance, such as a distance set by the licensing terms of content service 110 for the subscription account. The distance can be measured from a particular device in the domain. For example, a device is within range if it is within a certain distance from the EMD, another device in the domain which has an EPC, the most recently used device in the domain (e.g., most recent device to log in with the account credentials and/or access content with a valid EPC, etc.). In another embodiment, the distance may be any suitable distance which allows for synchronization of data between devices using wireless short range communication technology, such as near-field communication (NFC), Bluetooth, local Wi-Fi, ultra wideband (UWB), etc. In other embodiments, the distance can be updated dynamically based on various factors, such as the number of devices in the domain, the level of activity associated with the account (e.g., how often each device logs into the account and consumes content, how many devices are simultaneously accessing content at a given point in time, etc.), the type of wireless short range communication technology available on the devices, and so forth.

Various range detection techniques can be used to determine whether a device is within a particular distance of another device for EPC synchronization, such as Neighbor Awareness Networking (NAN) (e.g., Wi-Fi aware), short-range wireless radio (e.g., NFC), GNSS satellite-based positioning technology (e.g., GPS), shared public IP address, and so forth. For example, using NAN, devices within a cluster of neighboring devices which have the same account credentials (e.g., have logged in with the same account credentials or are otherwise associated with the same account) can synchronize EPCs with each other directly. In other examples, a third entity and/or a user action may be required (also referred to as assisted synchronization, discussed in further detail below). In another example, Bluetooth Low Energy (BLE) beaconing can be used to detect whether devices are within a particular range of each other, and the devices can communicate with each other (e.g., synchronize EPCs) without explicit pairing. In yet another example, content service 110 may additionally require explicit pairing between in-range devices for EPC synchronization.

When a receiving device is determined to be within range of a sharing device in the same domain (e.g., both devices have previously accessed content through the same account), a connection is established between the devices to facilitate synchronization of EPCs. According to some embodiments, connection between devices in the domain is established only with short range communication technology, such as NFC, Bluetooth, local Wi-Fi, UWB, and so forth, to ensure proximity between the devices. Accordingly, receiving devices not in proximity (e.g., within a short distance) to a sharing device (e.g., the EMD or other devices already synchronized with the current EPC) are unable to connect with another device and obtain an EPC for accessing content. For example, a device which misuses VPN to falsely appear to be in the same region as another device in the domain (e.g., by sharing the same public IP address) may not physically be in proximity with domain device and therefore cannot connect via short range communication methods. When in proximity, the devices synchronize EPCs with each other directly (e.g., without contacting the content service or any user action, otherwise referred to as assisted synchronization, discussed below). The direct synchronization can occur automatically upon establishment of the short-range connection. Direct synchronization typically occurs after the devices are within range of each other to exchange messages and after determining that the receiving device already has account credentials (e.g., has logged in using the account credentials). In some embodiments, the system uses low power radio-frequency (RF) protocols to check (e.g., periodically, consistently, etc.) whether a device is within range (e.g., a short range) of another device in the domain, connect the devices, and automatically synchronize EPCs between them after verifying that they belong to same domain.

In an embodiment, the system determines that the devices in proximity are part of the same domain by determining that they have accessed content associated with the same account. For example, content service 110 may determine that the devices each have previously or recently logged into the same account using the same account credentials and/or an EPC associated with the same account. In another embodiment, the system determines if devices in proximity are in the same domain by way of encrypting communications between the devices. For example, the devices compute a cryptographic hash on the username and/or password and a nonce. Each device verifies independently that the other device has the same account credentials, by sending a separate nonce as a challenge and receiving a response from the other. Conversely, devices that are in proximity of each other but do not have the same account credentials (e.g., one of the devices did not successfully respond to the challenge from the other device) will not synchronize EPCs. Other encryption and security measures known in the art may be implemented suitable for ensuring that only devices within the same domain can communicate and synchronize EPCs and/or unauthorized third party devices cannot access the account.

In direct synchronization, devices which are within proximity (e.g., certain range) of each other will automatically synchronize EPCs with each other directly (e.g., in the background, without user intervention). In some embodiments, a device (e.g., receiving device) which is within proximity of the EMD (e.g., sharing device) will synchronize EPCs directly with the EMD. In the alternative or in conjunction, a device within proximity of another device which already has the current EPC will synchronize EPCs directly with such device. In an example, suppose Alice's laptop 120 is the EMD which received the current EPC. Alice's smartphone 126, Bob's smartphone 124, and George's laptop 122 each have a previous EPC or temporary EPC, and are each nearby Alice's laptop 120 (for example, all three devices are located in the same house). Alice's laptop 120 detects that each of the three devices are within its range and that the EPCs of each device is different from the current EPC (e.g., on laptop 120), and automatically connects with each of the devices and synchronizes EPCs with each device.

Further in the example, Alice's smartphone 126 receives the current EPC from Alice's laptop 120. Alice's smartphone 126 detects that her tablet 128 is within proximity (of the smartphone 126) and that the respective EPCs of each device are different (e.g., one EPC is more recent than the other, or one EPC is a temporary EPC). Smartphone 126 automatically connects with tablet 128 and shares the updated EPC with tablet 128. Meanwhile, hotel television 140 and Carl's smartphone 130 are far away, in different locations, from Alice's smartphone 126. Therefore, hotel television 140 and Carl's smartphone 130 are not within proximity of the EMD and cannot synchronize EPCs with either the EMD or another device that has the current EPC to access Alice's account.

In assisted synchronization, a third entity (such as content service 110) and/or a user action assists with synchronization of EPCs between devices. In an embodiment, content service 110 provides the current EPC to any or each client device in the domain if the client device is a) determined to be within proximity of another device in the domain, b) the devices in proximity of each other have the same account credentials, and c) one of the devices in proximity of each other already has the current EPC (or is the EMD, or has recently logged into the account, or has a valid EPC while still within the grace period, etc.). Further in the example, proximity determination may also include time validation, wherein the devices are not only within range of each other, but such proximity occurs within a certain window of time. Time validation is discussed in further detail in FIG. 3.

In an example, suppose Alice's laptop 120 has the current EPC and/or is the EMD. Alice's laptop 120 may detect that her smartphone 126, George's laptop 122 and Bob's smartphone 124 are each within range of laptop 120. Alice's laptop 120 automatically collects range information from each of smartphone 126, laptop 122, and smartphone 124, and sends it to content service 110. Content service 110 validates, based on the range information, that the devices are within range of each other. For example, content service 110 can determine that devices 120, 122, 124, and 126 are in the same household or same region because they share the same public IP address or have similar satellite coordinates, etc. In another example, content service 110 periodically requests range information of devices in the domain. When content service 110 validates that the devices are within range of each other, content service 110 determines whether the devices in proximity are within the same account domain by determining whether they have the same account credentials (e.g., whether they have successfully accessed content associated with the account). Content service 110 then determines that one of the devices (e.g., Alice's laptop 120) already has the current EPC (for example, because content service 110 recently issued the current EPC to laptop 120 and/or has designated laptop 120 as the EMD). Upon these three determinations, content service 110 sends the current EPC to each of devices 122, 124, and 126.

Further in the example, suppose Alice's smartphone 126 becomes the next EMD during EMD rotation and receives the newest EPC. Alice's smartphone 126 may detect that her tablet 128 is nearby and may send range information relating to the tablet 128 to content service 110. Based on the range information, content service 110 confirms that tablet 128 is within range of smartphone 126. Upon confirming that Alice's tablet 128 has the same account credentials as her smartphone 126, and that smartphone 126 has the current EPC, content service 110 sends the newest EPC to tablet 128.

Also in the example, suppose Carl attempts to use his smartphone 130 to log into Alice's account, or a stranger attempts to log into Alice's account via hotel television 140. Carl's smartphone 130 and the hotel television 140 have invalid EPCs. Because Carl's smartphone 130 and hotel television 140 are far away from Alice's smartphone 126, smartphone 126 is unable to detect the presence of these devices. Range information for Carl's smartphone 130 and for hotel television 140 are not provided to content service 110. Thus, content service 110 does not identify smartphone 130 and hotel television 140 as being within range (of Alice's smartphone 126), and does not send the EPC to those devices.

In another embodiment, content service 110 may automatically send an EPC to each device which it determines is in the same household or vicinity. Various factors may determine the minimum number of devices in proximity of each other (also referred to as proximate devices) that is considered to be within the same household or vicinity, such as licensing terms associated with the account subscription, user preferences, or other system configurations. Statistical analysis of IP address usage may be used to identify a household or vicinity associated with an account. For example, if certain number of devices log into the same account from a single public IP address, content service 110 can memorize the IP address as belonging to a single mobile network (and thus, associated with a single account). Content service 110 may request location information of each device (such as IP address, GPS coordinates, and so forth) that logs into Alice's account. Content service 110 can determine that multiple devices 120, 126, 122, 124, and 128 share the same public IP address, or their GPS coordinates indicate that they are within a particular range of each other. Content service 110 then provides each of devices 120, 126, 122, 124, and 128 the current EPC. Meanwhile, content service 110 can determine that Carl's smartphone 130 and hotel television 140 do not share IP addresses with, or are not within the vicinity of, another device in the account domain. Therefore, content service 110 determines that smartphone 130 and hotel television 140 are not in the same household or vicinity associated with Alice's account (e.g., in having the same IP address or similar geolocation as other devices associated with Alice's account), and content service 110 does not send the current EPC to smartphone 130 or hotel television 140.

Figure 3:
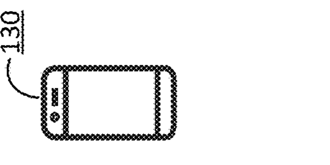
FIG. 3 is an illustrative diagram of time validation of nearby devices in a system for rotating license management, in accordance with some embodiments of the disclosure.
Figure 3:
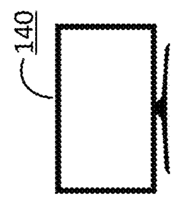
Figure 3:
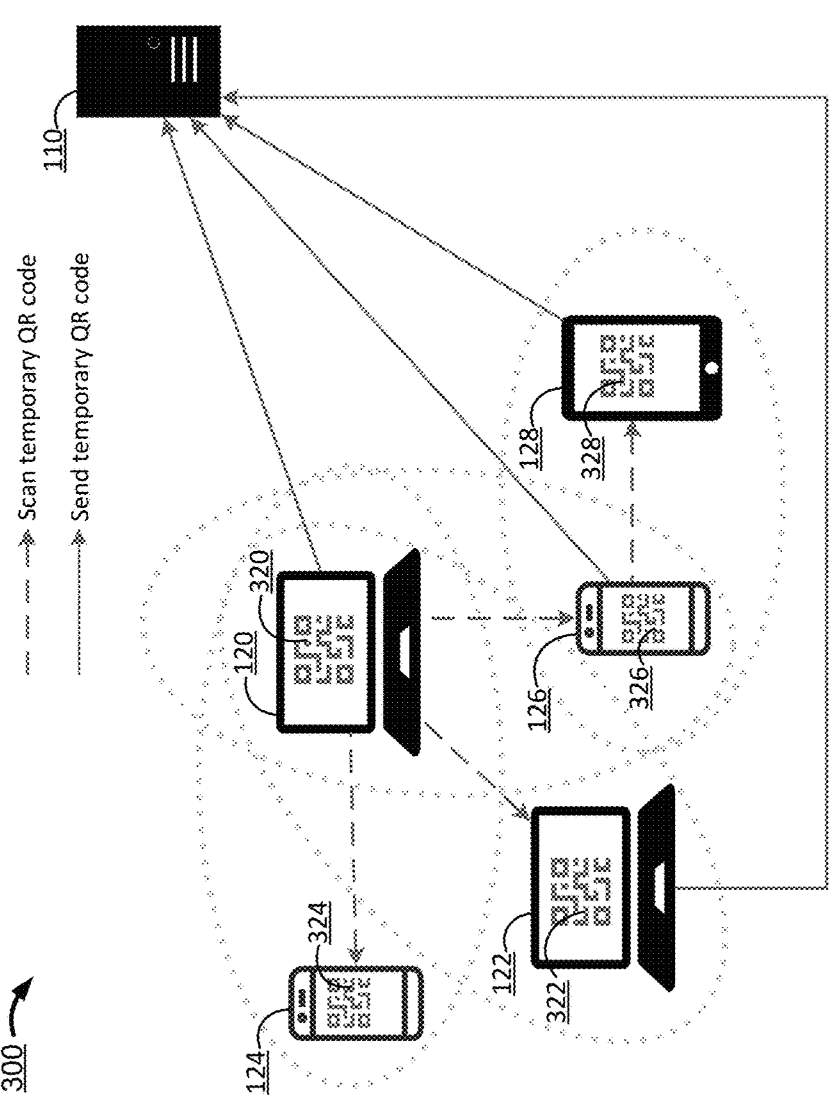

FIG. 3 is an illustrative diagram 300 of time validation of nearby devices in a system for rotating license management, in accordance with some embodiments of the disclosure. According to an embodiment, whether with direct synchronization or assisted synchronization, time validation of devices is used to confirm their proximity, by way of verifying that a valid EPC has been synchronized (e.g., by devices being within a short range of each other) and used for requesting content access within a time period (e.g., grace period). While devices in the same domain can be within range of each other and synchronize EPCs, such EPC is ineffective for accessing content unless it is valid (e.g., unexpired). For example, the EPC may expire after a length of time from when it was generated, from when it was transmitted to or used by the EMD, and so forth. In another example, EPC may expire once a new EPC is generated and/or issued to a newly designated EMD. In another embodiment, the EPC remains valid for a grace period after its original expiration (e.g., its expiration is extended) or after a new EPC is issued (to the EMD). For example, content service 110 can memorize a previous EPC for a grace period, during which content service 110 continues to recognize (e.g., validate or accept) the previous EPC. Accordingly, during the grace period, both the updated (e.g., current) EPC and the memorized (e.g., previous) EPC are valid and can be used to access content. The grace period may be a predetermined length of time. In other embodiments, the grace period can be configured dynamically, for example, based on the number of devices that are in the domain at a given time, the level of activity of the account (e.g., how often content is consumed from the account, how many times a device logs into the account, etc.), and so forth. In yet another embodiment, the grace period may be unique to each device, such as upon receipt of account credentials from the device. In some embodiments, the grace period for an EPC begins when the EPC originally expires and/or when an updated EPC is generated, transmitted to the EMD, or used by a device to access content, and so forth.

In another embodiment, with assisted synchronization, the devices are time validated before they are authorized to synchronize EPCs. Time validation can be used to ensure that the devices are currently in proximity with each other, in real-time (e.g., contemporaneously or within a very recent time frame) with respect to logging into the account (e.g., providing shared account credentials). Time validation can include validating a code (e.g., QR code), key, time-based one-time password, or other shareable form of electronic authentication that a device receives from another nearby device which has already been authorized to receive an EPC. The code is short-lived, and the receiving device would need to be nearby the sharing device in real-time in order to capture the code and transmit it to content service while the code is still valid. Once content service validates the code, content service may send the EPC to the receiving device. The code can be transmitted to the receiving device automatically (e.g., in the background) or with user intervention (e.g., by prompting the user to bring their device nearby the EMD or another device which already has the EPC). In another embodiment, where it is determined that a plurality of domain device is located in a single area (for example, laptop 120, smartphone 126, laptop 122, and smartphone 124 are all located in the living room) and the EMD (e.g., smartphone 126) is among the plurality, the system can prompt a user to locate to the area (e.g., prompt Alice to bring her tablet 128 to the living room). This results in tablet 128 being in proximity of the EMD without revealing which of the devices (120, 126, 122, or 124) is the current EMD.

In the example, suppose Alice's laptop 120 is the EMD and has received the current EPC. George attempts to log into Alice's account through his laptop 122, which has an invalid EPC (e.g., a previous EPC after its grace period or an expired temporary EPC). A QR code is sent to Alice's laptop 120 (or another device in the domain which has a valid EPC). The QR code can be temporary and/or dynamic (e.g., repeatedly changing periodically or at randomly determined intervals). George's laptop 122 is within range of Alice's laptop 120 because George's laptop 122 can capture an image of the QR code 320 directly from the screen of Alice laptop 120. Furthermore, George's laptop 122 is in such proximity to laptop 120 that laptop 122 can capture a live QR code before the QR code expires and/or is replaced with another QR code. George's laptop 122 sends the valid captured QR code 322 to content service 110. Upon verification of the QR code, content service 110 sends the current EPC to George's laptop 122.

Also in the example, suppose Carl attempts to log into Alice's account through his smartphone 130. In one embodiment, any device logging into the account which does not have a valid EPC would need to send a specific QR code to content service associated with a certain period of time (such as from the time of providing account credentials to content service 110). Carl's smartphone 130 is nowhere near Alice's laptop 120 to capture an image of the fleeting QR code 320 before it lapses or is replaced by another QR code. Unless Carl's smartphone 130 comes within range of Alice's laptop 120, Carl's smartphone 130 is unable to capture and send a valid QR code to content service 110, leaving Carl's smartphone 130 unauthorized to receive an EPC for accessing content through Alice's account. Moreover, because QR code is frequently updated, if Alice sends a screenshot of QR code 320 from her laptop 120 to Carl's smartphone 130, QR code 320 may no longer be valid by the time Carl receives it and sends it to content service 110.

Figure 4:
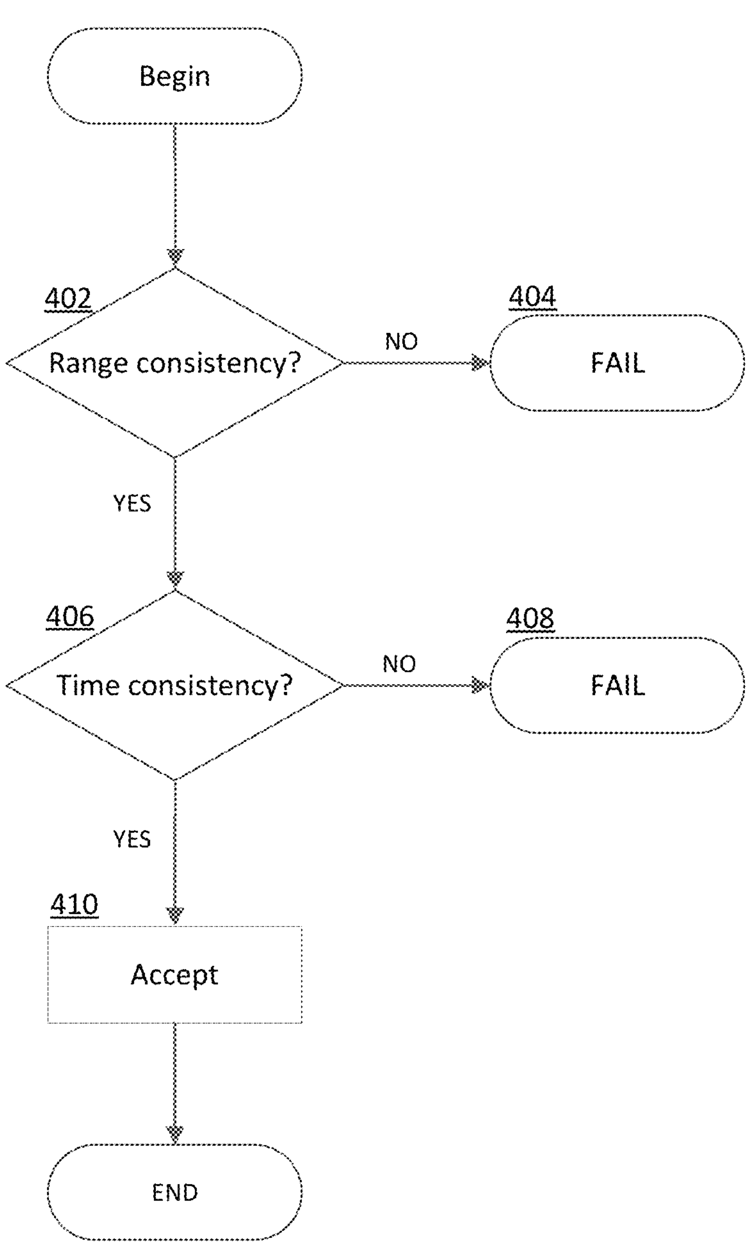
FIG. 4 is a flowchart of an example process of rotating license management, in accordance with some embodiments of the disclosure.

FIG. 4 is a flowchart of an example process 400 of rotating license management, in accordance with some embodiments of the disclosure. According to an embodiment, at step 402, the process determines whether a client device (e.g., receiving device) requesting access to content through a shared account is within range of another device in the account domain (e.g., sharing device, such as the EMD, another device which already has a valid EPC, etc.). Range is confirmed if the devices can connect via short range wireless communication technology (e.g., NFC, Bluetooth, local Wi-Fi, etc.). Alternatively or in conjunction, range information (e.g., data from BLE beacon signals, IP address, GPS coordinates, etc.) of the client device and another nearby device may be sent to the content service to validate range. In another example, a client device is within range of another device if the client device captures a form of electronic authorization (e.g., QR code) from a nearby device and sends the QR code to content service within a short period of time of the client device logging into the account. If the client device is not within range of another device in the domain, content access is denied at step 404.

At step 406, the process determines whether the client device is within range of another device in the domain contemporaneously with (or within a certain time frame of) the client device logging into the account (e.g., providing shared account credentials). Time consistency is confirmed if the client device is within range of the EMD (or another device with current EPC), such that the client device can synchronize with the current EPC. Time consistency can also be confirmed if the client device is within range of the EMD which a certain period of time (e.g., shortly after providing account credentials) such that the client device can capture a temporary and dynamic QR code from the EMD and send the QR code to the content service before the QR code expires. If the client device is not within range with another device in the domain around the same time it logged into the account, content access is denied at step 408. Otherwise, a client device which meets range consistency and time consistency is authorized to synchronize to a valid EPC and access content at step 410. Those skilled in the art will observe that both range and time consistency are verified in a single unified step with direct synchronization.

Figure 5:
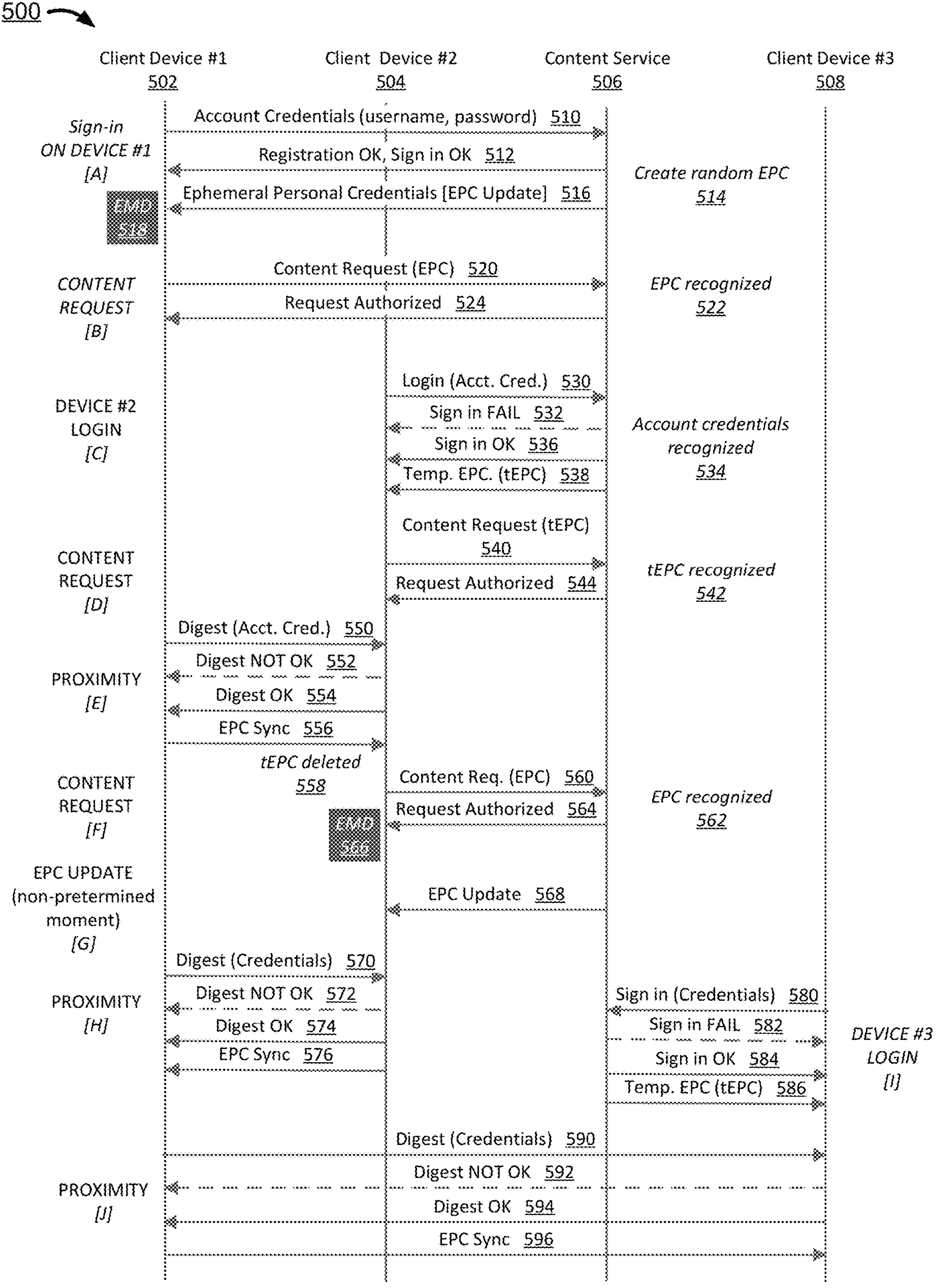
FIG. 5 is a system sequence diagram of example processes of rotating license management, in accordance with some embodiments of the disclosure.

FIG. 5 is a system sequence diagram 500 of example processes of rotating license management, in accordance with some embodiments of the disclosure. In Example A of FIG. 5, a user subscription account with the content service 506 has been created (e.g., account credentials have been created in association with the account). Content service 506 memorizes the account credentials in association with the account. This can allow multiple devices to log into the same account using shared account credentials. At step 510, client device #1 502 is provides account credentials (such as username and password). At step 512, content service 506 validates the account credentials. Content service 506 may memorize client device #1 502 by storing client device metadata in server stored data. Content service 506 memorizes (e.g., stores client device metadata) each device which accesses content associated with the account (e.g., has become part of the domain). Devices that are in the same domain which provide verified account credentials and valid EPC can access content from the same account associated with the domain.

At step 514, content service 506 generates an EPC associated with the user account. The EPC is generated randomly and is valid only for a period of time. The EPC can also be encrypted. At step 516, content service 506 transmits the EPC to client device #1 502. At step 518, content device #1 502 is designated the EMD and receives the EPC. The EMD role changes or rotates between devices in the domain. The EMD may comprise a device randomly selected from the domain, or the device which was most recently used in connection with the account, or the device that was the last in the domain to receive the most recent EPC, and so forth. In an embodiment, the current EPC is sent to the EMD first before other devices in the domain can synchronize with the current EPC. In an embodiment, in direct synchronization, content service 506 only sends the EPC to the EMD. Other client devices which need to obtain the current EPC to access content would need to be within range of the EMD (or another domain device with the current EPC) to synchronize EPCs. In another embodiment, in assisted synchronization, content service 506 sends the EPC to the EMD first, then to other devices in the domain which are determined to be within range of the EMD (or another domain device which already has the current EPC).

In Example B of FIG. 5, client device #1 502 (having previously provided verified account credentials) requests to access content. At step 520, client device #1 502 sends a content request with the EPC. At step 522, content service 506 recognizes (e.g., validates) the EPC as valid. Content service 506 may validate the EPC from a client device if the EPC matches the current EPC that was issued to the EMD within a particular time (e.g., recently or within the grace period of the previous EPC). In the situation where the EPC is encrypted, various encryption techniques, such as comparing HASHes, using private-public key signatures or other asymmetric encryption, etc., may be used to validate the EPC.

Because the EPC is ephemeral, it is valid for a certain period of time. The EPC expires after the period of time, for example, from the time it was generated, transmitted to and/or used by the EMD, upon generation of a new EPC or issuance of the new EPC to the EMD, etc. In some embodiments, the validity of an EPC is extended by a grace period (e.g., the expired EPC remains valid until the grace period ends). Thus, expiration of the EPC does not mean invalidity of the EPC. The grace period can be a predetermined length of time, such as from the time an EPC originally expires, when an updated EPC is generated, when an updated EPC is transmitted to the EMD, when the account credentials were received from the device holding the EPC, etc. Alternatively, the length of the grace period can be configured dynamically, for example, based on the number of devices that are in the domain at a given time, the level of activity of the account (e.g., how often content is consumed from the account, how many times a device logs into the account, etc.). Alternatively or in conjunction, various security methods may be used to encrypt the EPC or for the device to prove that the EPC it has is valid (e.g., without transmitting the EPC), such as HASHing, private-public key signatures or other asymmetric encryption, and the like.

At step 524, content service 506 authorizes the content request for client device #1 502 once the EPC is recognized. In some embodiments, the content is encrypted, and authorization of the content request includes sending content encryption keys to client device #1 502. If a device had previously accessed content (e.g., initiated a session), content service 506 can memorize (e.g., store) the session authorized. When the device logs out of the account and makes a subsequent successful request for content access, authorizing the content request can include authorizing access to resume the session. In another embodiment, where the content is encrypted, authorization includes returning respective content encryption keys to the client device to access content or a previous session.

In Example C of FIG. 5, a second client device #2 504 requests to access content from the same user account, using account credentials that were shared with client device #2 504. At step 530, client device #2 504 provides shared account credentials to content service 506. At step 532, if the account credentials are incorrect, account access is denied. At step 534, if content service 506 recognizes the account credentials (e.g., by comparing the received account credentials with those stored in association with the account), client device #2 504 may be required to provide a valid EPC. In some embodiments, if a device is a new device to the domain (e.g., requesting content access through the account for the first time), or is designated (e.g., by user preferences) as a temporary device, the device may be able to request content access using a temporary EPC in place of an EPC. A temporary EPC is short-lived (e.g., expires after 48 hours, etc.), can be used for multiple requests for content access during its short-lived lifespan, and becomes invalid after its expiration. The temporary EPC can be valid for a shorter time than the EPC (e.g., which can expire after two weeks and remain valid for another week during its grace period). Thus, alternatively at step 534, if content service 506 recognizes the account credentials provided by client device #2 504 but does not recognize client device #2 as belonging to the account domain, client device #2 may be required to provide a valid temporary EPC. Because client device #2 504 is logging into the account for the first time, or a is temporary device, content service 506 can generate and send a temporary EPC to client device #2 504 at step 538.

However, after receiving a temporary EPC, the device must obtain the current EPC (e.g., by synchronizing with a nearby EMD or another domain device with the EPC) during the time content service 506 continues to accept the temporary EPC. In an embodiment, content service 506 only sends an EPC to devices (thus designating them a master device) which have completed an onboarding period. If a device has provided account credentials and has been used in connection with the account for a length of time or a threshold number of sessions in which content was accessed, the device has completed the onboarding period.

In Example D of FIG. 5, client device #2 504 sends a content request with the temporary EPC to content service 506. At step 542, content service 542 validates the temporary EPC, for example, by comparing the temporary EPC received from client device #2 504 and the temporary EPC issued by content service 506 (e.g., that the temporary EPC is correct). At step 544, if the temporary EPC is validated, content access is authorized for client device #2 504.

In Example E of FIG. 5, client device #1 502 and client device #2 504 synchronize EPCs with each other. In particular, client device #1 502 (e.g., the sharing device) has the current EPC and client device #2 504 (e.g., the receiving device) has a temporary EPC. Client device #2 504 requests to synchronize with client device #1 502 to receive the current EPC. Range detection techniques described in FIG. 2 can be used to determine whether client device #1 502 and client device #2 504 are located within range of each other (e.g., whether they are proximate devices). EPC synchronization is authorized between proximate devices if they belong to the same domain associated with the same account. Devices that are part of the same domain share the same account credentials. Various techniques may be used to determine if the proximate devices are part of the same domain. In one example, content service 506 can determine that each device shares the same account credentials (such as by verifying that they have each logged into the account with correct account credentials) or based on matching client device metadata to client devices with server stored data of client devices that have previously accessed content associated with the account. In another example, at step 550, client device #1 502 can use short range wireless communication technology (e.g., NFC, Bluetooth, local Wi-Fi, etc.) to connect with and receive and confirm account credentials from the nearby client device #2 504. In yet another example, encryptions functions can be provided to each device. For example, the devices compute a cryptographic hash on the username and/or password and a nonce. Each device verifies independently that the other device has the same account credentials, by sending a separate nonce as a challenge and receiving a response from the other. Conversely, devices that are in proximity of each other but do not have the same account credentials (e.g., one of the devices did not successfully respond to the challenge from the other device) will not synchronize EPCs. Other encryption and security measures known in the art may be implemented suitable for ensuring that only devices within the same domain can communicate and synchronize EPCs and/or unauthorized third party devices cannot access the account. In another embodiment, EPC synchronization is authorized when the receiving device sends a valid QR code (or other form of electronic authorization) to content service 506, wherein the QR code is captured from a nearby sharing device.

At step 552, if the account credentials from client device #2 504 are not determined to the same, EPC synchronization is not authorized for the devices. Otherwise, at step 554, the account credentials from client device #2 504 are determined to be the same and EPC synchronization is authorized for the devices at step 556. At step 558, the temporary EPC is deleted as obsolete from client device #2 504 and replaced with the synchronized EPC.

In Example F of FIG. 5, client device #2 504 makes a content request using its synchronized EPC. At step 560, client device #2 504 sends a content request including the EPC to content service 506. At step 562, content service 506 recognizes (e.g., validates) the EPC. At step 564, the content request is authorized. In some embodiments, content service 506 memorizes the EPC for a grace period, during which content service 506 continues to recognize the EPC after it has expired and/or been updated to a new EPC. Thus, during the grace period, both the updated (e.g., current) EPC and the memorized (e.g., previous) EPC are valid and can be used to access content. The length of the grace period can be predetermined or configured dynamically (e.g., based on the number of devices that are in the domain at a given time, the level of activity of the account such as how often content is consumed from the account or how many times a device logs into the account, and so forth). The grace period can begin from the time the EPC expires, when an updated EPC is generated or transmitted to the EMD or used by a device to access content, when account credentials are received from a device, etc. In some embodiments, when an expired EPC on a device is in its grace period, a notification may be sent to the device to prompt its respective user to relocate within proximity of another device in the domain which has a current EPC.

In Example G of FIG. 5, the EMD changes or rotates to another device in the domain at step 566 and the EPC is updated at step 568. In an embodiment, the EMD is the first device in the domain to receive the updated EPC from content service 506. In other embodiments, the EMD is the sole device in the domain to receive the updated EPC from content service 506, and other domain devices obtain the updated EPC by being within range of the EMD. The EMD role can rotate based on various factors, such as when a new EPC for the account is generated, when the number of logins to the account reach a certain level, at randomly determined intervals, and so forth. The EMD can comprise a randomly selected device from the domain, the most recently used domain device in connection with the account (such as the last device to log into the account and consume content) or randomly selected from a set of most recently used devices, the last device in the domain to receive the most recent (e.g., the most recently expired or soonest to expire) EPC, the device in the domain which most frequently accesses content, etc. In other embodiments, multiple devices in the domain can be designated the master device.

In some embodiments, the master device is selected based on the frequency of device movement (e.g. frequency of change in location of a device). For example, a device in the domain which is more stationary than others (e.g., a set-top box (STB), smart TV, streaming stick coupled to a display, home assistant, etc.), may be selected as the master device. In other embodiments, the master device is selected based on the number and/or time a device is in proximity of other devices in the domain. For example, a device which is within a particular range of a certain number of other devices in the domain and/or for a certain period of time may be selected as the master device.

The EPC can be updated dynamically, such as at randomly determined times, when the number of logins to the account reach a certain level, when a new device registers with the account, etc. Each device in the domain can memorize (e.g., store) its EPC, which can be used repeatedly to access content until the EPC is invalid and/or the device updates the (previous) EPC by synchronizing EPCs with a sharing device having the current EPC. When two devices synchronize EPCs, the current or more recent EPC will replace the older one.

In some embodiments, content service 506 maintains record of each device in the domain and the corresponding EPC (e.g., whether the device has a current EPC, previous EPC, a temporary EPC etc). When a device has updated its EPC, the update is sent to content service 506. The record of devices and corresponding EPCs can be used to assist devices find other devices in the domain with the most recent EPC, such as by way of a notification prompt.

In some embodiments, if the EMD which received the updated EPC is infrequently used (e.g., has a low number of account logins or sessions, low average of logins or sessions per time period, low historical usage compared to average number of devices in use, has not accessed content for a period of time, has low historical usage compared to average, etc.), lost, broken, or powered off, then the device will no longer be designated as the EMD during future EMD rotations. In another embodiment, if content service 506 does not receive the currently issued EPC back from any device for a threshold period of time and/or after a threshold number of logins have been made using the previous EPC from the same domain within the grace period (of the previous EPC), then the EMD which received the currently issued EPC is deemed infrequently used (or out of use) and the status of the device has the EMD is revoked.

When the master status of an EMD is revoked, the EPC (that was sent to the removed device) is revoked and a new EPC is issued to a newly designated EMD. Also in the embodiment, revoking the EPC can reset the grace period of the previous EPC (if any) that was issued before the revoked EPC and still used by domain devices.

In Examples H and J of FIG. 5, client devices in the same domain can synchronize EPCs with each other if they are within range of each other. In Example H, client device #1 502 and client device #2 504 are within range of each other. Client device #1 502 has the previous EPC, while Client device #2 504 is the master device and has the current EPC. At step 570, client device #2 504 (e.g., the sharing device) validates the account credentials shared by client device #1 502. At step 572, if the account credentials are incorrect, EPC synchronization for client device #1 502 is denied. At step 574, if the account credentials are correct, EPC synchronization is authorized. At step 576, client device #1 502 receives from client device #2 504 the updated EPC to replace the previous EPC.

In Example J of FIG. 5, client device #1 502 and client device #3 508 are within range of each other. Client device #1 502 has the current EPC, due to an earlier EPC synchronization with the EMD. Client device #3 508 does not have an EPC, but has a temporary EPC. At step 590, client device #1 502 validates the account credentials shared by client device #3 508. At step 592, if the account credentials are incorrect, EPC synchronization for client device #3 508 is denied. At step 594, if the account credentials are correct, EPC synchronization is authorized. At step 596, client device #3 508 receives from client device #1 502 the current EPC, replacing the temporary EPC stored on client device #3 508.

In Example I of FIG. 5 (like Example C), client device #3 508 has not yet been added to the account domain and is signing into the account for the first time. At step 580, client device #3 508 provides account credentials to access the same user account as client device #1 502 and client device #2 504. At step 582, if the account credentials are incorrect, account access is denied. At step 584, if content service 506 recognizes the account credentials (e.g., by comparing the received account credentials with those stored in association with the account), client device #3 508 may be required to provide a valid EPC. Because client device #3 508 is a new device to the domain (e.g., logging into the account for the first time and has no other account use history with the account), or is designated (e.g., by user preferences) as a temporary device, client device #3 508 can request content access using a temporary EPC in place of an EPC. Thus, alternatively at step 584, if content service 506 recognizes the account credentials provided by client device #3 508 but does not recognize client device #3 as belonging to the account domain, client device #3 may need to provide a valid temporary EPC.

At step 586, content service 506 sends the temporary EPC to client device #3 508, which client device #3 508 can use to access content until the temporary EPC expires or client device #3 508 receives an EPC by synchronizing with another device in the domain which already has the EPC. In some embodiments, content service 506 generates one temporary EPC (or one set of temporary EPCs) associated with the account to be used by any new or temporary device (that provides verified account credentials) until the temporary EPC expires. In other embodiments, content service 506 generates a temporary EPC unique for each new or temporary device.

Figure 6:
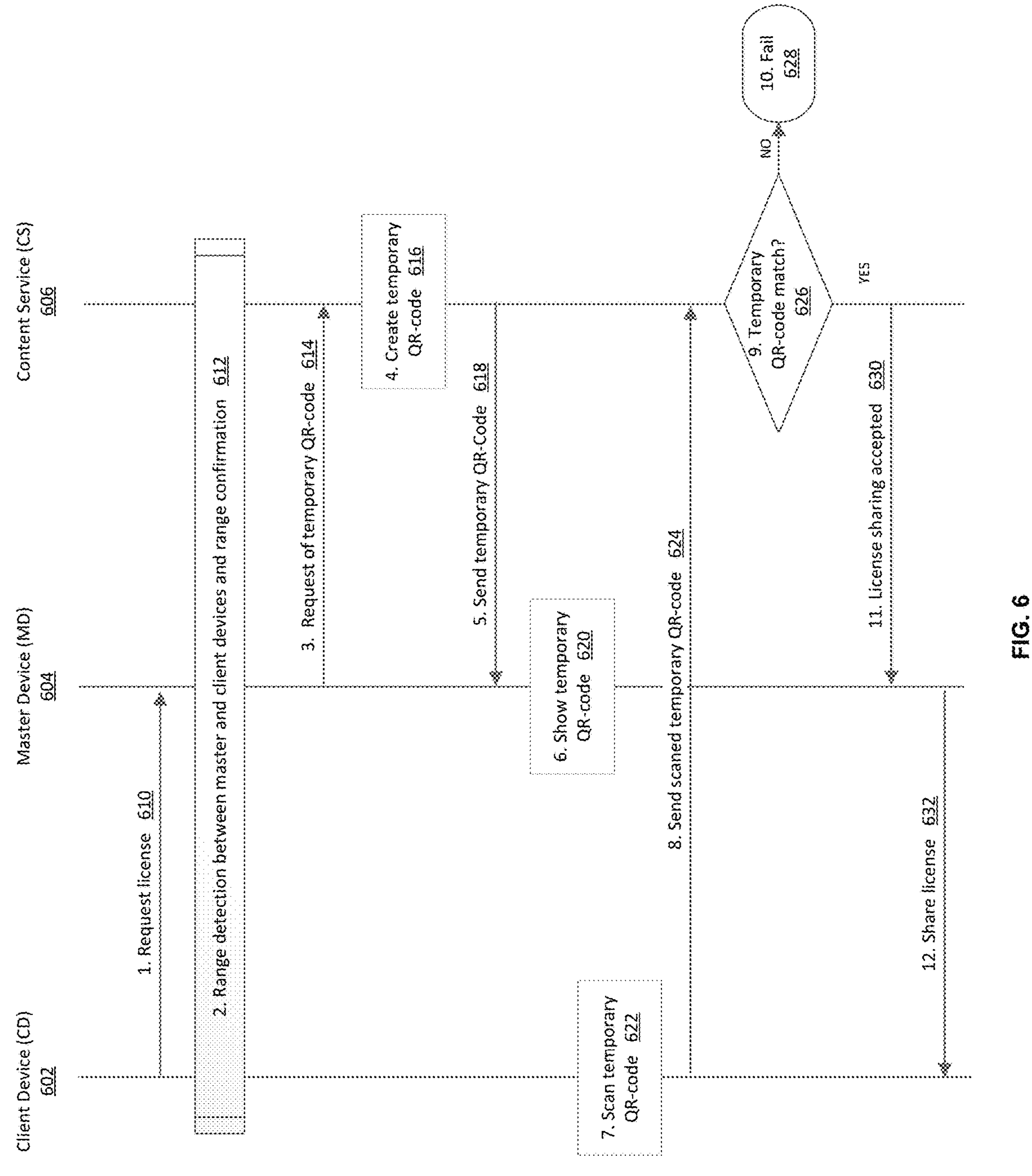
FIG. 6 is a system sequence diagram of another example process of rotating license management, in accordance with some embodiments of the disclosure.

FIG. 6 is a system sequence diagram 600 of another example process of rotating license management, in accordance with some embodiments of the disclosure. In the example, assisted synchronization is used for sharing EPCs between devices in the same domain and within proximity of each other. At step 610, client device 602 requests master device (e.g., EMD) 604 to share an EPC (e.g., license to access content). At step 612, range information between client device 602 and master device 604 is collected and sent to content service 606 to determine whether the devices are within range of each other. Range information can be determined based on various range detection techniques described in FIG. 2. Range information can indicate whether client device 602 and master device 604 are within the appropriate range (e.g., based on licensing terms associated with the subscription account) for authorizing EPC synchronization (e.g., license sharing).

At step 614, master device 604 requests a temporary QR code from content service 606. In other embodiments, other shareable forms of electronic authorization can be requested, such as short-term electronic PINs, time-based one-time passwords, push notification certificates, private keys, among others. In some embodiments, the license request (e.g., request for EPC to access content) from client device 602 prompts the master device 604 to request the QR code from content service 606. The QR code is temporary (e.g. expires a specific period of time after its creation or after it is received by master device 604). Additionally, the QR code can be dynamic (e.g., changing periodically or at randomly determined times).

At step 616, content service 606 generates the QR code associated with the account. In another embodiment, the QR code is generated at the master device. The QR code is randomly generated. At step 618, the QR code is sent to master device 604. At step 620, master device 604 displays the QR code, such that a nearby device can capture the code (for example, by way of scanning an image of the code, or receiving a time-based one-time password via short range wireless communication, etc.). At step 622, client device 602 scans the QR code and sends the code to content service 606 at step 624.

At step 626, the QR code is validated. For example, the QR code received from client device 602 is compared with the QR code that was originally sent to master device 604. At step 628, if the QR code is invalid, license sharing to access content is denied. For example, the QR code may be expired by the time client device 602 receives or sends the QR code. In another example, content service 606 may verify the identity of the client device sending the QR code, based on comparing client device metadata with server stored data on devices registered with the account domain. Suppose an outside device (e.g., outside of the domain) comes within range of the master device 604, captures the QR code displayed on master device 604, and sends the QR code to content service 606. Content service 606 determines that the outside device does not belong to the domain of the account associated with the QR code and denies content access to the outside device.

At step 630, if the QR code is valid (e.g., the QR code received from client device 602 matches the QR code originally sent to master device 604), permission is granted to master device 604 to share the license (e.g., EPC). At step 632, master device 604 shares the license with client device 602. In the example, master device 604 is restricted from sharing the license with a nearby device unless it receives permission from content service 606. Content service 606 keeps record of devices in the domain which are authorized to receive an EPC. If permission is not granted to client device 602, but master device 604 nonetheless shares the license with client device 602, then content request is denied when client device 602 sends the EPC to content service 606. In another embodiment, upon validation of the QR code, content service 608 directly shares the license with client device 602.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
generating an ephemeral personal credential (EPC) associated with a user account associated with a content provider;
transmitting the EPC to a first device of a plurality of devices, wherein the first device is authorized to access content from the content provider via the user account, and wherein a second device of the plurality of devices is unauthorized to access content from the content provider via the user account;
based at least in part on determining that the first device is located within a particular distance of the second device such that the first device and the second device can communicate with each other by way of short range communication, causing the second device to synchronize the EPC with the first device;
receiving account credentials from the second device of the plurality of devices;
determining that the account credentials are associated with the user account;
receiving the EPC from the second device; and
based at least in part on determining the EPC received from the second device is valid, authorizing the second device to access content from the content provider via the user account.

2. The method of claim 1, wherein each of the plurality of devices is associated with the user account.

3. The method of claim 1, wherein the first device is randomly selected from the plurality of devices.

4. The method of claim 1, wherein the first device is at least one of most recently used from the plurality of devices, most frequently used from the plurality of devices, or which received a most recent EPC associated with the user account.

5. The method of claim 1, further comprising:
periodically generating a subsequent EPC associated with the user account, wherein each subsequent EPC is valid during a corresponding subsequent time period.

6. The method of claim 5, wherein at least one of the EPC and the subsequent EPC is valid during the subsequent time period.

7. The method of claim 1, wherein the first device comprises one of the plurality of devices that is associated with the account credentials for at least an onboarding period.

8. The method of claim 1, further comprising:
based at least in part on determining the account credentials received during a first login attempt from the second device are associated with the user account and that the second device is not associated with the user account, generating a temporary EPC associated with the user account;
transmitting the temporary EPC to the second device;
receiving the temporary EPC from the second device during at least the first login attempt or subsequent login attempts;
based at least in part on determining the temporary EPC received from the second device is valid, authorizing the second device to access content from the content provider via the user account.

9. The method of claim 8, wherein the temporary EPC is valid during a time period.

10. The method of claim 1, further comprising:
causing a QR code to be displayed on the first device;
receiving the QR code from the second device; and
based at least in part on determining that the second device is within the particular distance of the first device based on the received QR code, transmitting the EPC to the second device.

11. The method of claim 10, further comprising:
updating the QR code;
causing the updated QR code to be displayed on the first device; and
based at least in part on receiving the updated QR code from the second device, transmitting the EPC to the second device.

12. The method of claim 1, further comprising:
based at least in part on determining that the EPC has not been received from at least one device during a time period:
generating a second EPC; and
transmitting the second EPC to a third device of the plurality of devices.

13. The method of claim 1, further comprising:
based at least in part on determining that a number of logins to the user account using the EPC is over a threshold number of logins during a time period:
generating a second EPC; and
transmitting the second EPC to the second device.

14. A system comprising:
processing circuitry configured to:
generate an ephemeral personal credential (EPC) associated with a user account associated with a content provider;
transmit the EPC to a first device of a plurality of devices, wherein the first device is authorized to access content from the content provider via the user account, and wherein a second device of the plurality of devices is unauthorized to access content from the content provider via the user account;
based at least in part on determining that the first device is located within a particular distance of the second device such that the first device and the second device can communicate with each other by way of short range communication, cause the second device to synchronize the EPC with the first device;
receive account credentials from the second device of the plurality of devices;
determine that the account credentials are associated with the user account;
receive the EPC from the second device; and
based at least in part on determining the EPC received from the second device is valid, authorize the second device to access content from the content provider via the user account.

15. The system of claim 14, wherein each of the plurality of devices is associated with the user account.

16. The system of claim 14, wherein the first device is randomly selected from the plurality of devices.

17. The system of claim 14, wherein the first device is at least one of most recently used from the plurality of devices, most frequently used from the plurality of devices, or which received a most recent EPC associated with the user account.

18. The system of claim 14, wherein the processing circuitry is further configured to:

periodically generate a subsequent EPC associated with the user account, wherein each subsequent EPC is valid during a corresponding subsequent time period.

19. The system of claim 18, wherein at least one of the EPC and the subsequent EPC is valid during the subsequent time period.

20. The system of claim 14, wherein the first device comprises one of the plurality of devices that is associated with the account credentials for at least an onboarding period.

* * * * *